United States Patent
Da et al.

(10) Patent No.: US 12,187,638 B2
(45) Date of Patent: Jan. 7, 2025

(54) ULTRATHIN GLASS WITH SPECIAL CHAMFER SHAPE AND HIGH STRENGTH

(71) Applicant: SCHOTT Glass Technologies (Suzhou) Co. Ltd., Jiangsu (CN)

(72) Inventors: Ning Da, Jiangsu (CN); Feng He, Jiangsu (CN)

(73) Assignee: SCHOTT GLASS TECHNOLOGIES (SUZHOU) CO. LTD., Jiangsu (CN)

(*) Notice: Subject to any disclaimer, the term of this patent is extended or adjusted under 35 U.S.C. 154(b) by 1033 days.

(21) Appl. No.: 17/098,121

(22) Filed: Nov. 13, 2020

(65) Prior Publication Data
US 2021/0078899 A1    Mar. 18, 2021

Related U.S. Application Data

(63) Continuation of application No. PCT/CN2018/086879, filed on May 15, 2018.

(51) Int. Cl.
*C03C 21/00* (2006.01)
*C03C 17/22* (2006.01)
*C03C 17/28* (2006.01)

(52) U.S. Cl.
CPC ............ *C03C 21/002* (2013.01); *C03C 17/22* (2013.01); *C03C 17/28* (2013.01)

(58) Field of Classification Search
None
See application file for complete search history.

(56) References Cited

U.S. PATENT DOCUMENTS

| | | | |
|---|---|---|---|
| 3,981,709 A | 9/1976 | Kondo | |
| 8,110,279 B2 | 2/2012 | Shashidhar | |
| 2010/0279067 A1 | 11/2010 | Sabia | |
| 2013/0288010 A1 | 10/2013 | Akarapu | |
| 2015/0165548 A1* | 6/2015 | Marjanovic | C03B 33/091 219/121.73 |
| 2015/0183680 A1* | 7/2015 | Barefoot | C03C 21/002 428/220 |
| 2015/0210588 A1 | 7/2015 | Chang | |

(Continued)

FOREIGN PATENT DOCUMENTS

| | | |
|---|---|---|
| CN | 105102393 | 11/2015 |
| CN | 107074637 | 8/2017 |

(Continued)

OTHER PUBLICATIONS

JP 2015093822 translation from PE2E search (Year: 2015).*

(Continued)

*Primary Examiner* — Jodi C Franklin
(74) *Attorney, Agent, or Firm* — Ruggiero McAllister & McMahon LLC

(57) ABSTRACT

A chemically toughened glass article is provided that has a thickness (t) of equal to or less than 0.4 mm, a first surface, a second surface, and a compressive stress region that is defined by a compressive stress (CS) of at least 100 MPa and at least one edge connecting the first surface and the second surface. The at least one edge has at least one chamfer with a chamfer width (A) and a chamfer height (B). The chamfer has a ratio of chamfer width/chamfer height (A/B) of between 1.5-20 and the chamfer has a ratio of chamfer width/glass thickness (A/t) of at least 0.5.

23 Claims, 4 Drawing Sheets

(56) References Cited

U.S. PATENT DOCUMENTS

| | | | |
|---|---|---|---|
| 2016/0372147 A1* | 12/2016 | Azuma | B24B 1/005 |
| 2017/0008793 A1* | 1/2017 | Bankaitis | C03B 33/091 |
| 2017/0183258 A1* | 6/2017 | Ottermann | B65H 18/28 |
| 2017/0334773 A1 | 11/2017 | Katayama | |
| 2017/0341973 A1* | 11/2017 | Gross | C03C 3/097 |
| 2018/0074397 A1* | 3/2018 | Koike | C03C 21/002 |
| 2018/0101253 A1* | 4/2018 | He | C03C 27/10 |
| 2018/0251400 A1* | 9/2018 | Bookbinder | C03B 23/0307 |
| 2018/0319696 A1* | 11/2018 | Akiba | C03C 21/003 |
| 2018/0346376 A1* | 12/2018 | Fukada | C03C 21/002 |
| 2019/0100457 A1* | 4/2019 | Luzzato | C03C 19/00 |

FOREIGN PATENT DOCUMENTS

| | | | |
|---|---|---|---|
| CN | 107614454 | 1/2018 | |
| CN | 107635935 | 1/2018 | |
| JP | 2015093822 | 5/2015 | |
| JP | 2015197784 | 11/2015 | |
| JP | 2016050158 | 4/2016 | |
| JP | 2017507099 | 3/2017 | |
| WO | WO-2013031547 A1 * | 3/2013 | B24B 9/10 |
| WO | 2014036267 | 3/2014 | |
| WO | 2015095089 | 6/2015 | |
| WO | 2016186936 | 11/2016 | |

OTHER PUBLICATIONS

International Search Report dated Feb. 15, 2019 for corresponding International Application PCT/CN2018/086879.

Written Opinion of International Searching Authority dated Feb. 15, 2019 for corresponding International Application PCT/CN2018/086879.

International Preliminary Report on Patentability dated Nov. 17, 2020 for corresponding International Application PCT/CN2018/086879, 6 pages.

* cited by examiner

ULTRATHIN GLASS WITH SPECIAL CHAMFER SHAPE AND HIGH STRENGTH

CROSS REFERENCE TO RELATED APPLICATIONS

This application is a continuation of International Application PCT/CN2018/086879 filed May 15, 2018, the entire contents of which are incorporated herein by reference.

BACKGROUND

1. Field of the Invention

The invention relates to a chemically toughened glass article having a thickness of equal to or less than 0.4 mm, a first surface, a second surface and a compressive stress region being defined by a compressive stress of at least 100 MPa, and at least one chamfered edge connecting the first surface and the second surface. The invention is also related to use of the chemically toughened glass article as flexible universal plane in flexible and printed electronics, sensor for touch control panels, finger print sensors, thin film battery substrates, mobile electronic devices, semiconductor interposers, flexible and bendable displays, solar cells, or other applications where a combination of high chemical stability, temperature stability, low gas permeability, flexibility, and low thickness is necessary. Besides consumer and industrial electronics said invention could also be used for protection applications in industrial production or metrology.

2. Description of Related Art

Thin glasses with different compositions are suitable substrate material for many applications where transparency, high chemical and thermal resistance, and defined chemical and physical properties are important. For example, alkaline free glasses can be used for display panels and as electronic packaging materials in wafer format. The alkaline contained silicate glasses are used for filter coating substrate, touch sensor substrate, and fingerprint sensor module cover.

Aluminosilicate (AS), lithium aluminosilicate (LAS), borosilicate and soda-lime glasses are widely used for applications such as covers for finger print sensor (FPS), protection cover, and display cover. In these applications, the glasses usually will be chemically toughened to achieve a high mechanical strength, as determined by special tests, e.g. 2-point bending (2PB), ball drop, pen drop, sharp impact resistance, sharp contact resistance anti-scratch and others.

Chemical toughening is a well-known process to increase strength of glass like soda lime glass or aluminosilicate (AS) glass or lithium aluminosilicate (LAS) or borosilicate glass that is used as cover glass for display applications, for example. In this circumstance, the surface compressive stresses (CS) are typically between 100 and 1,000 MPa and the depth of the ion-exchange layer is typically bigger than 30 µm, preferably bigger than 40 µm. For safety protection applications in transportation or aviation, AS Glass could have exchange layers bigger than 100 µm. Normally, a glass having both high CS and high DoL is targeted for all these applications, and thickness of glass usually ranges from about 0.5 mm to 10 mm.

In present times, the continuous demand for new functionality of product and wider area of applications call for glass substrates even thinner and lighter with high strength and flexibility. The fields in which ultrathin glass (UTG) typically applied are protective cover of fine electronics, i.e. flexible and foldable display and so on. At the present time, the increasing demands for new functionalities of products and exploiting new and broad applications call for thinner and lighter glass substrates with new properties such as flexibility. Due to the flexibility of UTG such glasses have been searched and developed as a cover glasses and displays for devices such as for example smartphones, tablets, watches and other wearables. Such a glass can also be used as a cover glass of a finger print sensor module and as camera lens cover.

However, if glass sheet gets thinner than 0.5 mm, handling will get more and more difficult mainly due to defects such as cracks and chippings at the glass edges which lead to breakage. Also, the overall mechanical strength i.e. reflected in bending strength or impact strength will be significantly reduced. Usually the edge of thicker glass could be CNC (computer numerical control) grinded to remove the defects, but, the mechanical grinding is hardly applied for ultrathin glass with thickness less than 0.3 mm. Etching on the edge could be one solution for ultrathin glass to remove defects, but the flexibility of thin glass sheet is still limited by the low bending strength of glass itself. As a result, strengthening of the glasses is extremely important for thin glasses. However, for ultrathin glass strengthening is always accompanied by the risk of self breakage due to high central tensile stress of glass.

Typically, <0.5 mm thick flat ultrathin glasses can be produced by direct hot-forming methods such as down draw, overflow fusion or special float procedures. Redraw methods are also possible. Compared with post-treated thin glass by chemical or physical method (e.g. produced via grinding and polishing), the direct hot-formed thin glass has much better surface uniformity and surface roughness because the surfaces are cooled down from high temperature melting state to room temperature. Down-drawn method could be used to produce glass thinner than 0.3 mm or even 0.1 mm, such as aluminosilicate glasses, lithium aluminosilicate glasses, alkali borosilicate glasses, soda lime glasses or alkaline free aluminoborosilicate glasses.

Chemical toughening of UTG has been described by some inventions. US2015183680 describes a toughening of <0.4 mm glass with limited range of central tension range and DoL>30 µm. However, DoL>30 µm leads to problems like fragility and self-breakage in ultrathin toughened glass. Furthermore, how the <0.4 mm thick glass is prepared is not illustrated in this patent application. WO 2014036267 has claimed glass should have a product of the compressive stress and depth of layer which is greater than 21000 µm·MPa to have high flexural strength, while such high CS and DoL do not applied for ultrathin glass.

US20100279067 and WO 2016186936 have claimed that the edge without obvious chamfer could lead to the high strength of glass. On the contrary, WO2015095089 has described a way of laser processing to get chamfer on the glass edge to reduce the stress concentration on the sharp edge. US20130288010 has given some examples to improve the strength of toughened glass of 0.1 to 3 mm thickness by controlling the chamfer angle, and the edge will be ground to certain shape. U.S. Pat. No. 8,110,279 has given a method to improve the edge strength of glass by mechanically rounding the chamfer angle between edge and surface of a 2 mm thick glass.

SUMMARY

The purpose of the invention is to provide a chemically toughened glass article having a thickness of at most 0.4 mm and an improved bending strength. Another object is to find a way to predict the bending strength and bending radius of a toughened ultrathin glass article.

Glass article: The glass article can be of any size. For example it could be a long ultrathin glass ribbon that is rolled (glass roll) or a single smaller glass part cut out off a glass roll or a separate glass sheet or a single small glass article (like a FPS or display cover glass) etc.

Ultrathin glass: In the purpose of this invention ultrathin glass is a glass with a thickness of equal to or less than 0.4 mm, preferred of equal to or less than 0.14 mm, especially more preferred of equal to or less than 0.1 mm.

Thickness (t): The thickness of a glass article is the arithmetic average of the thickness of the sample to be measured.

Compressive Stress (CS): The induced compression among glass network after ion-exchange on the surface layer of glass. Such compression could not be released by deformation of glass and sustained as stress. Commercially available test machine such as FSM6000 (company "Luceo Co., Ltd.", Japan, Tokyo) could measure the CS by waveguide mechanism.

Depth of Layer (DoL): The thickness of ion-exchanged layer, a region of glass where CS exists. Commercially available test machine such as FSM6000 (company "Luceo Co., Ltd.", Japan, Tokyo) could measure the DoL by wave guide mechanism.

Central Tension (CT): When CS is induced on one side or both sides of single glass sheet, to balance the stress according to the 3rd principle of Newton's law, a tension stress must be induced in the center region of glass, and it is called central tension. CT could be calculated from measured CS and DoL.

Average roughness (Ra): A measure of the texture of a surface. It is quantified by the vertical deviations of a real surface from its ideal form. Commonly amplitude parameters characterize the surface based on the vertical deviations of the roughness profile from the mean line. Ra is arithmetic average of the absolute values of these vertical deviations.

Bending strength (BS): The bending strength of ultrathin glass is measured by 2 point bending method where a piece of ultrathin glass is place between two parallel plates, and the two plates move closer to each other in parallel until glass is broken, and the distance between the plates upon breakage is recorded.

The bending strength is calculated by the equation:

$$\sigma = 1.198 \frac{tE}{(d-t)(1-v^2)}.$$

Where σ is the bending strength if part of tested ultrathin glass surface is contacting the surface of the two pressing plates. In the test, the length of samples is carefully selected to make sure that, upon breakage, the glass surface is in contact with the top and bottom plate surface in 2 point bending, otherwise the bending strength cannot be calculated by the above mentioned formula. t is glass thickness, and E is the Young's modulus of glass, and d is the distance between two plates upon breakage, and v is the Poisson ration of glass.

The bending strength is determined by using a UTM (universal testing machine) on small samples at room temperature of about 20° C. and relative humidity of about 50%. The glass article is brought into a bent position and its opposite ends are positioned between two parallel plates (steel plates). Then the distance between the plates is lowered continuously so that the bending radius of the glass article decreases until breakage wherein the loading speed is 60 mm/min. The distance between the plates is recorded when the ultrathin glass article is kinking or damaging or breaking into two or several piece which is determined by the signal of the UTM software. From that distance, the corresponding bending radius of the glass article at the time of breakage is calculated and thus the bending strength can be calculated.

Breakage bending radius (BBR): The breakage bending radius (given in mm) is the minimum radius (r) of the arc at the bending position where a glass article reaches the maximum deflection before kinking or damaging or breaking. It is measured as the inside curvature at the bending position of a glass material. A smaller radius means greater flexibility and deflection of glass. The bending radius is a parameter depending on the glass thickness, the Young's modulus and the glass strength. Chemically toughened ultrathin glass has very small thickness, low Young's modulus and high strength. All the three factors contribute to low bending radius and better flexibility. BBR could be calculated from bending strength:

$$r = \frac{Et}{2\sigma} \text{ or } r = \frac{(d-t)(1-v^2)}{2.396}.$$

According to one aspect of the invention a chemically toughened glass article having a thickness (t) of equal to or less than 0.4 mm, a first surface and a second surface which is opposite to the first surface and a compressive stress region being defined by a compressive stress (CS) of at least 100 MPa, and at least one edge connecting the first surface and the second surface, wherein the at least one edge has at least one chamfer with a chamfer width (A) and a chamfer height (B). The chamfer has a ratio of chamfer width/chamfer height (A/B) of between 1.5-20 and the chamfer has a ratio of chamfer width/glass thickness (A/t) being at least 0.5. In the context of the invention, the chamfer can be an inclined plane or a curved surface.

Such a glass article according to the invention has an improved bending strength. Surprisingly it was found that regardless of the glass type the inventive features regarding edge shape, i.e. the ratio A/B and A/t, have a strong impact on the bending strength performance of an ultrathin glass article. In contrast to the prior art which tried to improve the performance of UTG by optimizing the curvature of the edge the inventors have found that the given inventive ratios are very important for generating a high bending strength of a thin glass article. The inventive combination of compressive stress (caused by chemically toughening) and edge geometry improve the bending strength of a glass article to a very high extend.

The ultrathin glass article according to the invention has a thickness of equal to or less than 400 µm, preferably less than or equal to 330 µm, also preferably less than or equal to 250 µm, further preferably less than or equal to 210 µm, preferably less than or equal to 180 µm, also preferably less than or equal to 150 µm, more preferably less than or equal to 130 µm. Especially preferred embodiments have a thickness of less than or equal to 100 µm, more preferably less than or equal to 80 µm, more preferably less than or equal to 75 µm, more preferably less than or equal to 70 µm, more preferably less than or equal to 65 µm, more preferably less than or equal to 60 µm, more preferably less than or equal to 55 µm, further preferably less than or equal to 50 µm, more preferably less than or equal to 45 µm, more preferably less than or equal to 40 µm, more preferably less than or equal to 35 µm, further preferably less than or equal to 30 µm, more preferably less than or equal to 25 µm, more preferably less than or equal to 20 µm, even preferably less than or equal to 10 µm. Such particularly thin glass articles are desired for various applications as described above. In particular, the thin thickness grants the glass flexibility. The thickness can be at least 5 µm.

The ratio A/B according to the invention is in the range between ≥1.5 to 20. It was surprisingly found by the inventors that the bending strength greatly increases if the ratio gets higher. Thus, an advantageous lower limit for the ratio A/B can be >1.5, preferably ≥1.75, preferably ≥2.0, also preferably ≥2.25, preferably ≥2.5, more preferably ≥2.75, more preferably ≥3.0, also preferably ≥3.25, further preferably ≥3.5, also preferably ≥3.75, preferably ≥4.0. However, a too high ratio A/B does not help to further increase the bending strength. Thus the ratio A/B is at most 20. An advantageous upper limit for the ratio A/B can be ≤19, preferably ≤18, preferably ≤17, preferably ≤16, preferably ≤15, preferably ≤14, preferably ≤13, preferably ≤12, preferably ≤11, preferably ≤10, preferably ≤9, preferably ≤8. Advantageous ranges for the ratio A/B can be 1.5 to 20, 1.5 to 15, 2 to 10, 3 to 8 or 4 to 8.

According to an advantageous embodiment the least one edge of the chemically toughened glass article has a first chamfer towards the first surface with a ratio A/B and a second chamfer towards the second surface with a ratio A'/B'. Thus, the glass article is chamfered on both sides. This feature increases the bending strength especially when the first chamfer and the second chamfer are essentially symmetrical on both sides of the glass article. In an advantageous variant of the invention the difference between A/B and A'/B' is smaller than 30%, preferably 20%, also preferably 10%. This helps to further improve the bending performance of the glass article.

Additionally, the inventors have found that the ratio of chamfer width/glass thickness (A/t) increases the bending strength if it is ≥0.5, preferably >0.5. In an advantageous embodiment the ratio A/t is >0.6, preferably >0.7, more preferably >0.8, also preferably >0.9, also preferably >1.0, further preferably >1.1, also preferably >1.2. Some variants preferably have a ratio A/t of >1.3, also preferably >1.4, further preferably >1.5.

The surface compressive stress (CS) of the glass article according to the invention is at least 100 MPa. Preferably CS is higher than 200 MPa, more preferably higher than 300 MPa, more preferably higher than 400 MPa, more preferably higher than 500 MPa, more preferably higher than 600 MPa. According to preferred embodiments of the invention CS is equal to or more preferably higher than 700 MPa, more preferably higher than 800 MPa, more preferably higher than 900 MPa, further preferably higher than 1000 MPa. However, CS should not be very high because the glass may otherwise be susceptible to self-breakage. Preferably, CS is equal to or lower than 2000 MPa, preferably equal to or lower than 1600 MPa, advantageously equal to or lower than 1500 MPa, more preferably equal to or lower than 1400 MPa. Some advantageous variants even have a CS of equal to or lower than 1300 MPa or equal to or lower than 1200 MPa.

The depth of layer (DoL) of the glass article is in an advantageous embodiment from >1 µm to <40 µm. Preferably DoL is ≤30 µm, preferably ≤20 µm. DoL is preferably ≥3 µm, preferably ≥5 µm, preferably ≥7 µm. In connection with ultrathin glasses having a thickness of at most 100 µm preferably the DoL is ≤17 µm, preferably ≤15 µm, also preferably ≤13 µm, further preferably ≤11 µm, also preferably ≤10 µm.

It can be sufficient if only one surface of the glass article is chemically toughened. Preferably both the first surface and the second surface are chemically toughened as described above, so there is a DoL on both sides of the glass article.

The chemically toughened glass article according to the invention has an improved bending strength (BS). According to an advantageous embodiment, the glass article has a bending (BS) of >700 MPa, preferably >800 MPa, preferably >900 MPa, preferably >1000 MPa. Some advantageous variants have a BS of >1100 MPa, preferably >1200 MPa, also preferably >1300 MPa, further preferably >1400 MPa. This ensures high bending strength and flexibility.

The quality and quantity of the bending performance achieved by the invention can also be described by the difference between the bending strength (BS) and the compressive strength (CS) of a glass article. According to a further preferred embodiment, the glass article has a difference (BS−CS) of at least 150 MPa, preferably at least 200 MPa, more preferably at least 300 MPa, also preferably at least 400 MPa, also preferably at least 500 MPa.

According to an advantageous aspect of the invention, the inventors have found that the glass article has a greatly improved bending performance when an average bending strength (BS) of the glass article is higher than $$CS + 10a\frac{A}{B} - a\left(\frac{A}{B} - 1\right)^2 + 20a\frac{A}{t},$$

wherein "a" is a constant (factor) being ≥4, preferably ≥6, more preferably ≥8, also preferably ≥10.

It is further advantageous when the chemically toughened glass article has an average breakage bending radius of smaller than $$\frac{50000\,t}{CS + 10a\frac{A}{B} - a\left(\frac{A}{B} - 1\right)^2 + 20a\frac{A}{t}},$$

wherein "a" is a constant being ≥4, preferably ≥6, more preferably ≥8, also preferably ≥10.

It is further advantageous when the chemically toughened glass article has a bending radius smaller than $$\frac{100000\,t}{CS + 10a\frac{A}{B} - a\left(\frac{A}{B} - 1\right) + 20a\frac{A}{t}}$$

without breakage, wherein "a" is a constant being ≥4, preferably ≥6, more preferably ≥8, also preferably ≥10.

The breakage bending radius is determined by using a UTM (universal testing machine) at room temperature of about 20° C. and relative humidity of about 50%. The glass article is brought into a bent position and its opposite ends are positioned between two parallel plates (steel plates). Then the distance between the plates is lowered so that the bending radius of the glass article decreases wherein the loading speed is 60 mm/min. The distance between the plates is recorded when the ultrathin glass article is kinking or damaging or breaking into two or several piece which is determined with the naked eye. From that distance the corresponding bending radius of the glass article at the time of breakage is calculated. This 2 point bending test is adjusted to and is especially suitable for ultrathin glass articles and reproduces in a quite simple manner the above mentioned problem, that is the bending of a glass article (e.g. a FPS or a touch display or a flexible display) upon loading it. In this context the 2 point bending method is more reliable for ultrathin glass than other known bending strength tests such as 3 and 4 point bending tests.

As mentioned above a chemically toughened glass articles according to the invention can have quite different sizes. Therefore, in the course of determining the properties such as bending strength and breakage bending radius the following has to be taken into account:

In the case of larger glass articles (e.g. a glass roll or a large glass sheet), a plurality of samples are measured. For this a random sample N values is taken. N should be high enough to obtain a statistically ensured average value. Preferably at least 15, more preferably at least 20, more preferably at least 30 samples are tested. The number of samples depends on the respective size of the glass article to be tested. The measured values are averaged, and the average value is taken to represent the bending strength.

However, in the case of small glass articles (e.g. an individual small cover glass) a single measured value of bending strength is sufficient and is taken to represent bending strength.

For the breakage bending radius an average value can be calculated. For doing this, a random sample of N values is taken. The number of samples depends on the respective size of the glass article to be evaluated. Preferably N should be high enough to obtain a statistically ensured average value. Preferably at least 20, more preferably at least 30 samples are tested. Thus, a random sample of N values is taken for the breakage bending radii $R_1 \ldots R_N$, and, for the values of these random samples, the average value $$\langle R \rangle = \frac{1}{N} \sum_{i=1}^{N} R_i$$

and the variance $$s = \sqrt{\frac{1}{N-1} \sum_{i=1}^{N} (R_i - \langle R \rangle)^2}$$

are calculated.

The average breakage bending radius is taken to represent claimed breakage bending radius. However, in the case of small glass articles (e.g. an individual small cover glass) a single measured value of breakage bending radius is sufficient and is taken to represent claimed breakage bending radius.

According an advantageous variant of the inventive glass article the edge has a structured section having a plurality of rounded, substantially hemispherical depressions.

According to a further advantageous aspect of the invention the chemically toughened glass article can resist a pen drop breakage height of higher than 20 mm with or without additional materials depositing or laminating on the glass article. The pen drop resistance, i.e. the resistance of a glass article against breakage when a drop of a pen weighing about 5 gram, with a tungsten carbide ball equal to or less than 0.7 mm diameter is dropped vertically onto the glass article, is an important feature of the strength of ultrathin glass. The chamfer processing and geometry used in this invention keeps the pen drop performance of ultrathin glass. When placing chamfer processed ultrathin glass on a PE film with thickness of 100 μm, the breakage height of pen drop is higher than 20 mm. The pen drop breakage height can be improved further by laminating or depositing one or more materials on the surface of the ultrathin glass article, for example metal, ceramic, another layer of glass and/or polymer.

In an advantageous embodiment, the chemically toughened glass article comprises at least at one surface a coated or laminated layer of an organic or inorganic material in order to improve for example the impact resistance. Suitable materials are described below.

In one embodiment, the glass is an alkali-containing glass, such as alkali aluminosilicate glass, alkali silicate glass, alkali borosilicate glass, alkali aluminoborosilicate glass, alkali boron glass, alkali germinate glass, alkali borogermanate glass, alkali soda lime glass, and combinations thereof.

This and other aspects of the present invention will be apparent from the following description, accompanying drawings and the appended claims.

BRIEF DESCRIPTION OF THE DRAWINGS

The following is a description of the figures in the accompanying drawings. The figures are not necessarily to scale but shown exaggerated in scale or in schematic in the interest of clarity and conciseness.

DETAILED DESCRIPTION

Figure 1:
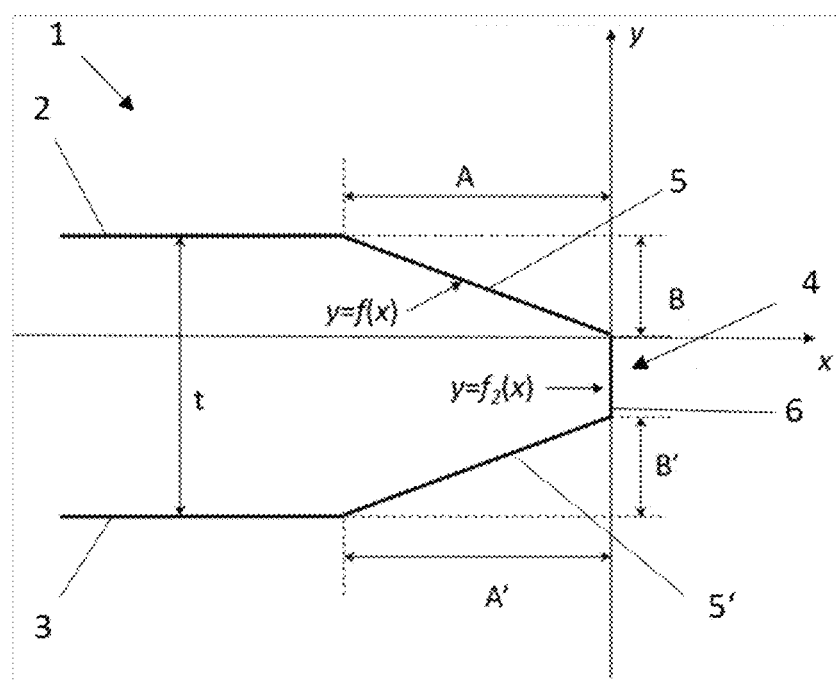
FIG. 1 is a cross-section of a portion of a chemically toughened glass article showing a first exemplary edge type according to the invention.

In FIGS. 1 to 6 different preferred embodiments of chemically toughened glass article according to the invention are shown in cross-sections. In each case the glass article 1 has a thickness t of less than 0.4 mm, a first surface 2, a second surface 3 and at least one edge 4 connecting the first surface 2 and the second surfaces 3. The total thickness of the glass is t. At the connection between the first surface 2 and the edge 4, there is a chamfer 5 with a chamfer width A and a chamfer height B. At the connection between the second surface 3 and the edge 4, there is another chamfer 5' with a chamfer width A' and a chamfer height B'. There is compressive stress region extending from the first surface 2 to a first depth in the glass article (DoL), the region is defined by a compressive stress (CS) wherein CS is at least 100 MPa at the first surface. Preferably there is compressive stress region extending from the second surface 3 to a second depth in the glass article (DoL), the region is defined by a compressive stress (CS) wherein CS is at least 100 MPa at the second surface. The glass article 1 has a defined chamfer ratio of chamfer width/chamfer height (A/B, A'/B') and a defined ratio of chamfer width/glass thickness (A/t, A'/t). In each case the chamfer width A, A' is much higher than the chamfer height B, B', thus the ratio is >than 1. The ratios A/B, A'/B' are ≥1.5-20, preferably 1.5-15, preferably 2-10, even preferably 3-8, preferably 4-8. The chamfer is nearly symmetric on both sides, i.e. the difference between A/B and A'/B' is smaller than 30%, 20% and 10%. The ratio between chamfer width A, A' and glass thickness t is >0.5, >0.6, >0.8, >1. The bending strength of chemically toughened glass article can be greatly improved with this special edge geometry.

Both CS value and chamfer shape influence the bending strength and determines bending radius. The average bending strength of the ultrathin glass is higher than CS+10*a*A/B−a*(A/B−1)^2+20*a*A/t, where "a" is a constant (factor) of a≥4, preferably ≥6, preferably ≥8, preferably ≥10. It was found by the inventors that in the case of ultrathin glasses such glasses can reach extremely high bending strength if the above mentioned parameters are realized.

FIGS. 1 to 5 show different illustrations of advantageous cross-sections of portions of chemically toughened glass articles in a schematic way. Here, the chamfers 5, 5' are symmetric on both sides, which is a preferred design.

Figure 2:
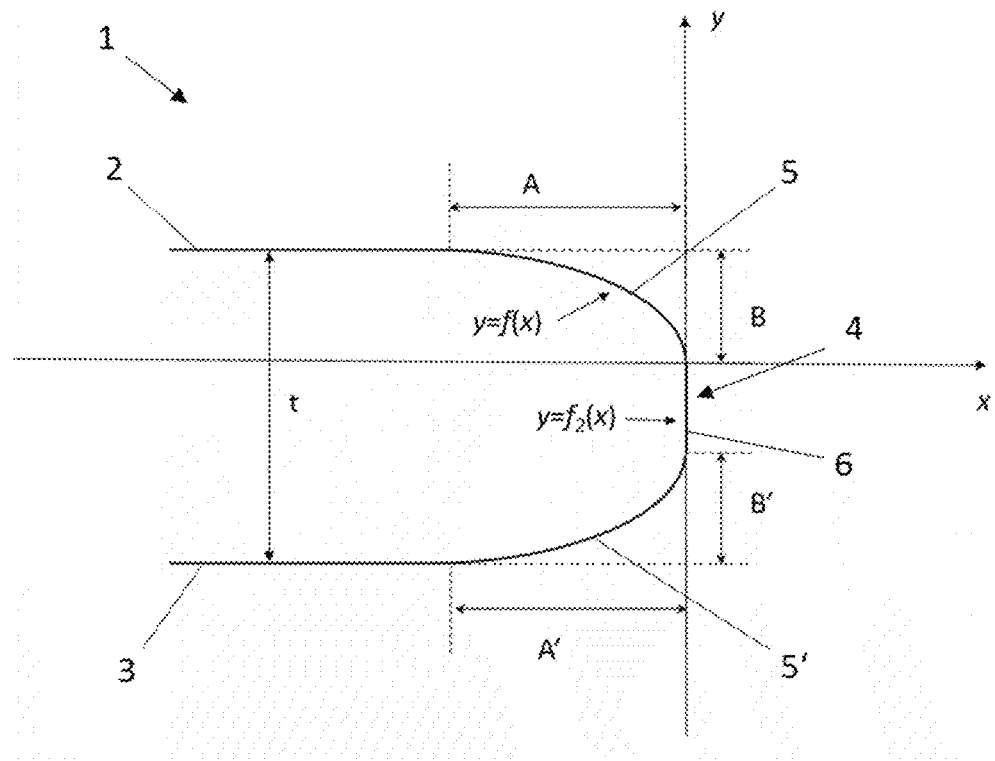
FIG. 2 is a cross-section of a portion of a chemically toughened glass article showing a second exemplary edge type according to the invention.

In each case the total thickness of the glass article 1 is t. At the connection between the first surface 2 and the edge 4, there is a chamfer 5 with width A and height B. To define the width A and height B two surfaces need to be defined first. In FIGS. 1 and 2, the chamfer 5 can be an inclined plane to the first surface 2 or a curved surface by using a function of y=f₁(x). In these embodiments, the edge 4 also comprises a terminal section 6, which is a vertical section here, i.e. a plane that is orientated vertically to the first surface 2 and the second surface 3. At the connection between the second surface 3 and the edge 4, there is another chamfer 5' with width A' and height B'. A or A' can be defined by the projected length of the curve y=f₁(x) on the x-axis, while the B or B' can be defined by the projected length of the curve y=f₁(x) on the y-axis as shown in FIGS. 1 and 2.

Figure 3:
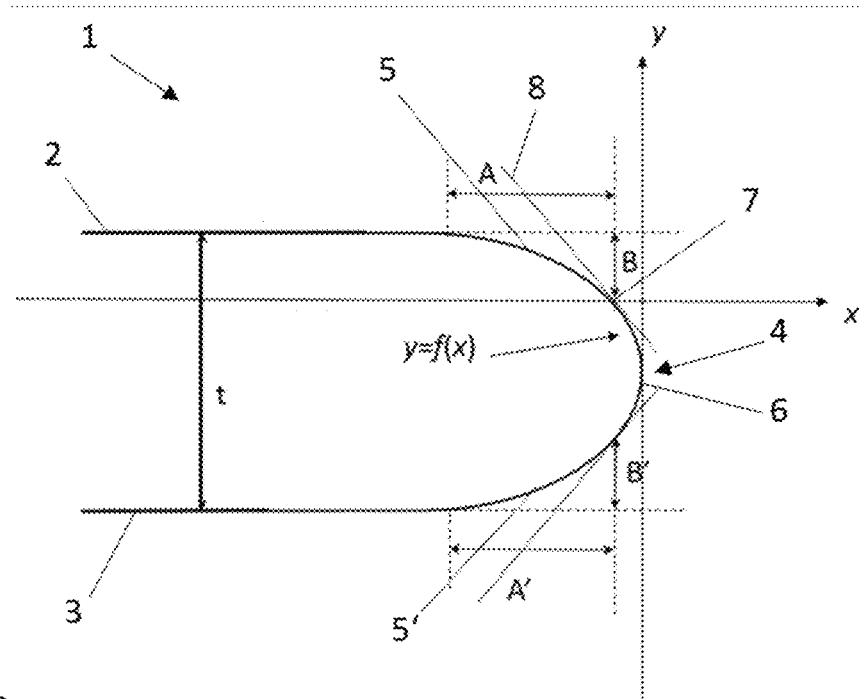
FIG. 3 is a cross-section of a portion of a chemically toughened glass article showing a third exemplary edge type according to the invention.

In FIG. 3, the chamfer 5, 5' is a continuous curved surface, the terminal section 6 of edge 4 does not comprise a distinct vertical section. The boundary point 7 of the chamfer width and chamfer height is to define where the tangent 8 angle of the curve to y-axis is larger than 45°. Then the curve surface from the first surface 2 to the boundary point 7 is taken for the base of height and width. Then A, A' and B, B' can be determined following the method described in connection with FIGS. 1 and 2.

Figure 4:
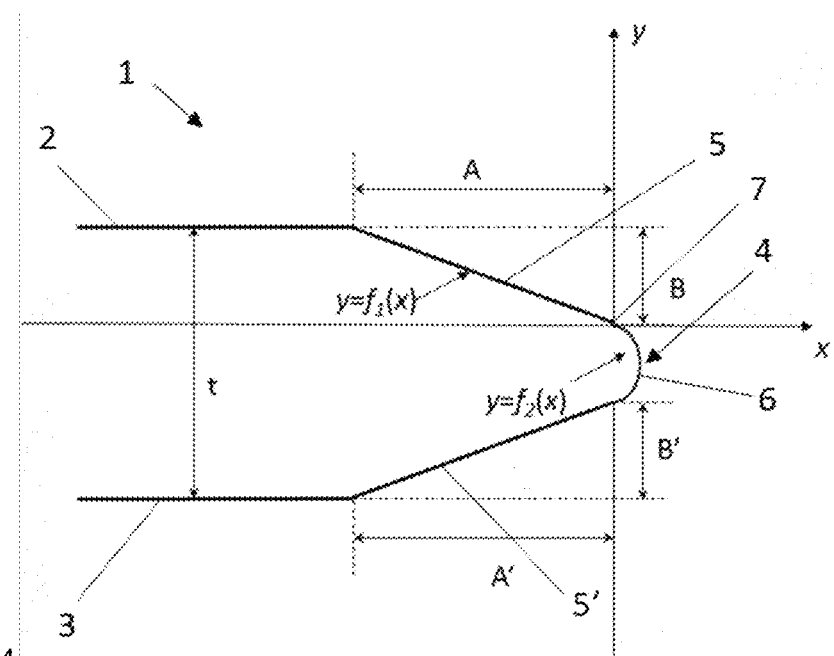
FIG. 4 is a cross-section of a portion of a chemically toughened glass article showing a fourth exemplary edge type according to the invention.
Figure 5:
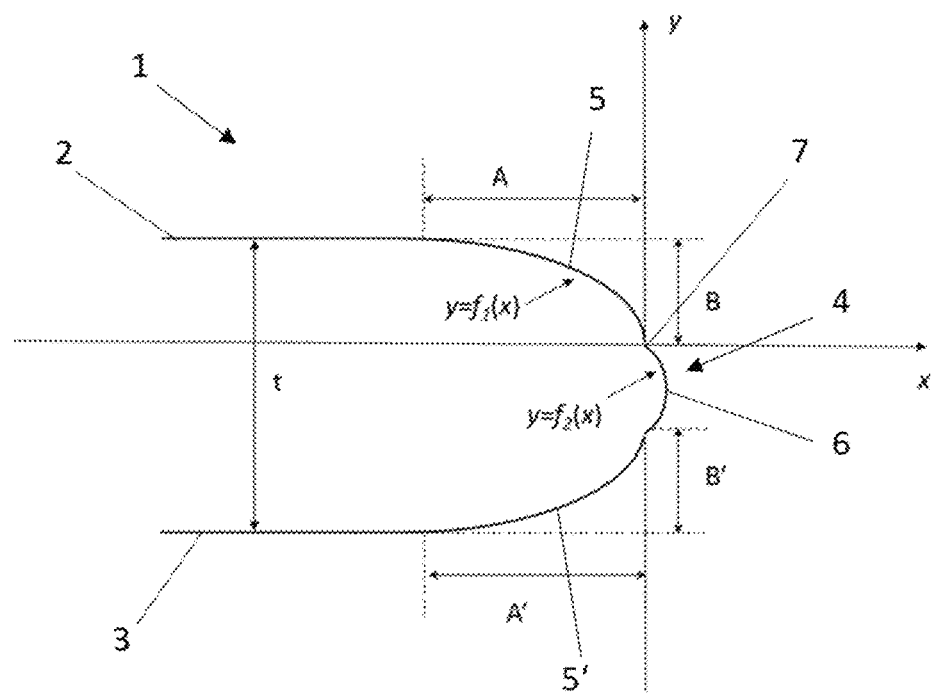
FIG. 5 is a cross-section of a portion of a chemically toughened glass article showing a fifth exemplary edge type according to the invention.

In FIGS. 4 and 5, both of the chamfer 5, 5' and the terminal section 6 of the edge 4 are two discontinuous curved surfaces. The boundary point 7 (or boundary line, when thinking 3-dimensionally) of the two surfaces are defined at the point of the unequal of the quadratic differential $f_1''(x) \neq f_2''(x)$. Then determination of the width A and height B of the chamfers 5, 5' shown in FIGS. 4 and 5 can follow the method described in connection with FIGS. 1 and 2.

The ratios A/B and A/t (determined by the methods described above) are further important and are used for evaluating the bending strength of a glass article. Preferably the measured average bending strength of the ultrathin glass article is higher than $$CS + 10a\frac{A}{B} - a\left(\frac{A}{B} - 1\right)^2 + 20a\frac{A}{t},$$

where "a" is a factor of a≥4, preferably ≥6, preferably ≥8, preferably ≥10. Advantageously, the average breakage bending radius of the ultrathin glass is smaller than $$\frac{50000t}{CS + 10a\frac{A}{B} - a\left(\frac{A}{B} - 1\right)^2 + 20a\frac{A}{t}}.$$

Furthermore, all the ultrathin glass article advantageously reach bending radius of $$\frac{100000t}{CS + 10a\frac{A}{B} - a\left(\frac{A}{B} - 1\right)^2 + 20a\frac{A}{t}}$$

without breakage.

By means of these criteria, it can be decided whether a strengthened ultrathin glass article is suitably strong and flexible enough to be used for the respective application before it becomes part of a product because thinner glass is especially sensitive to breakage caused by bending and/or contacts with hard and sharp objects.

Figure 6:
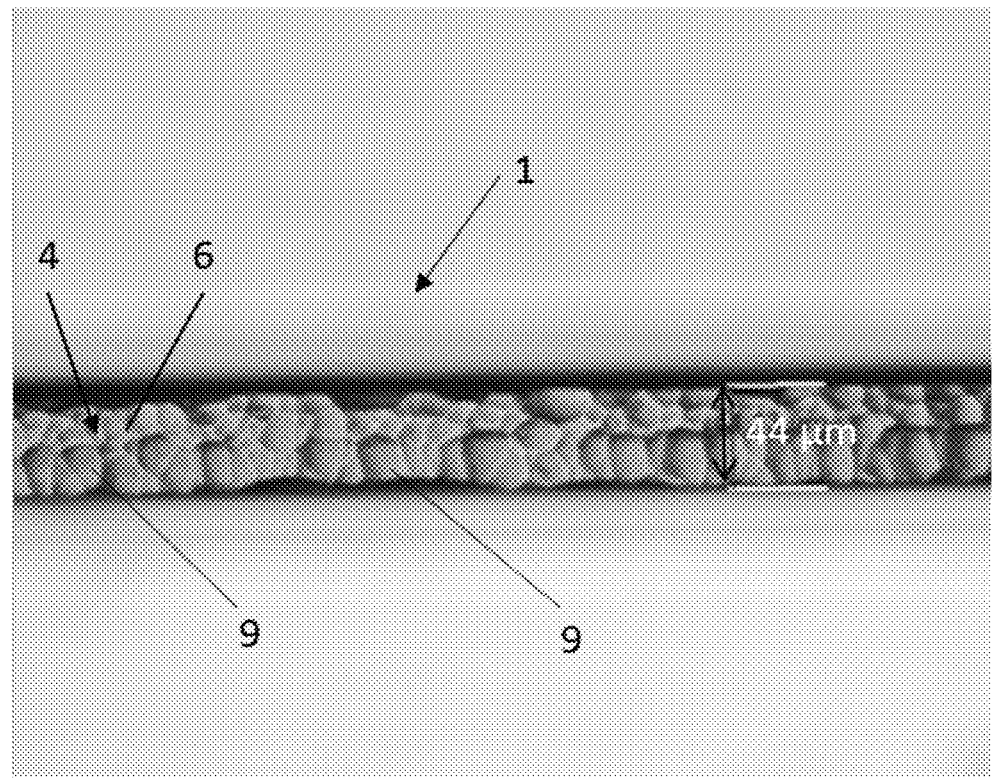
FIG. 6 is an optical micrograph of the vertical section of an edge of a glass article of the invention.

FIG. 6 shows an optical micrograph of the terminal section 6 of an edge 4 of a glass article 1 of the invention. It can be seen that the edge 4 has a structured vertical section having a plurality of rounded, substantially hemispherical depressions 9 after etching. This kind of edge has a very high strength. The rounded structures represent a particularly advantageous shape in order to dissipate tensile stresses occurring on the surface down to the lowest point of the surface, namely the lowest points of the substantially hemispherical depressions 9. This effectively suppresses crack growth at possible defects in the surface. Such rounded, substantially hemispherical depressions 9 may be advantageous for all edge shapes.

Using a laser for cutting the glass articles may enhance the formation of such rounded depressions in combination with later etching. For example an ultrashort pulse laser can be used which radiates in the glass to be cut glass a pulse or a pulse packet having at least two successive laser pulses thus producing flaws. Using laser with a burst mode (i.e. the laser energy is not supplied as a single pulse but as a sequence of pulses which follow one another at short intervals and together form a pulse packet) with inward radiation of a pulse packet may be particularly advantageous in order to achieve elongated uniform flaws, for example a neodymium-doped yttrium. aluminium garnet laser having a wavelength of 1064 nm can be used. After that step, the cut glass can be exposed to an etching medium which removes material from the glass which generates rounded, substantially hemispherical depression in the surface of the edge, this could be the vertical section and/or chamfered section. A slow etching process can be preferred. Suitable etching media are described below. Alternatively instead of using laser cutting the edge can also be mechanically cut e.g. by cutting wheel or dicing with generating micro crack at the edge surface. Further alternatively such micro cracks can be induced by grinding the edge surface by CNC. After that step, the cut glass can be exposed to an etching medium which removes material from the glass which generates rounded, substantially hemispherical depression in the surface of the edge.

Figure 7:
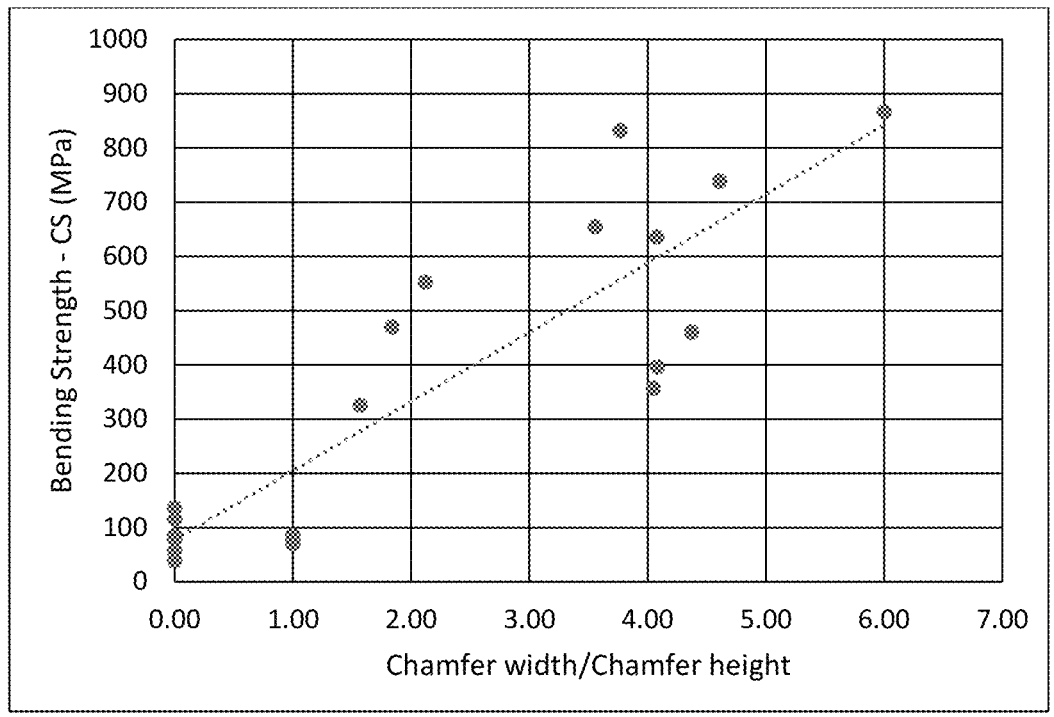
FIG. 7 is a plot showing the difference (bending strength-CS) versus ratio chamfer width/chamfer thickness for comparative and working examples.
Figure 8:
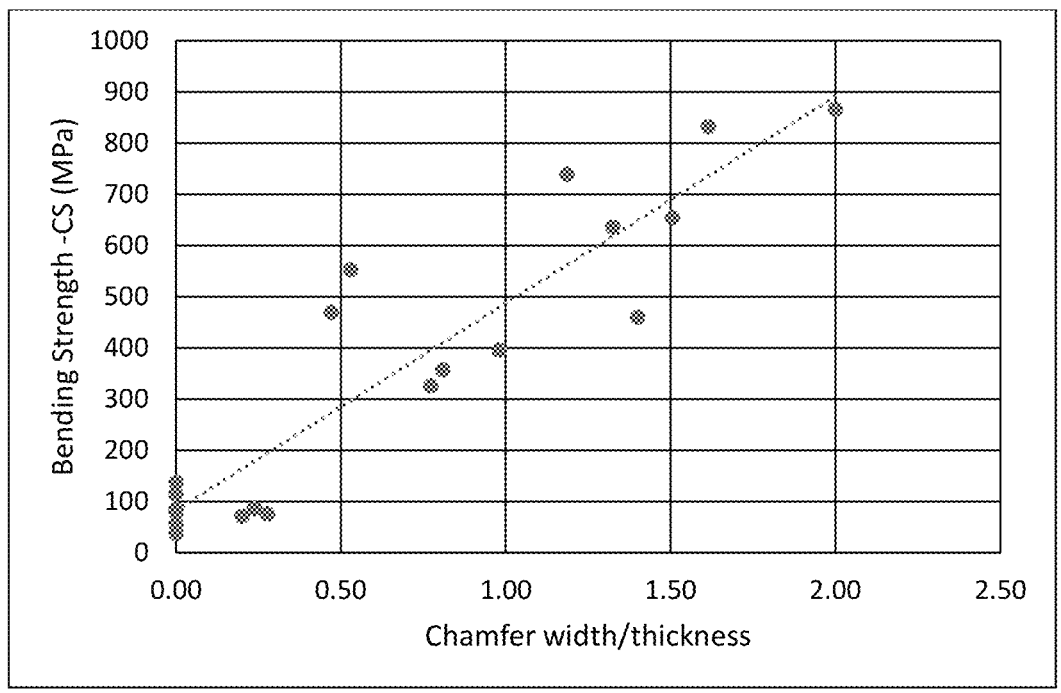
FIG. 8 is a plot showing the difference (Bending strength-CS) versus ratio chamfer width/chamfer height for comparative and working examples.

Surprisingly it was found by the inventors that the bending strength of the ultrathin glass article is highly related to the ratio between A/B, A'/B' and A/t, A'/t, as shown in FIGS. 7 and 8. The strength (expressed by the difference between bending strength (BS) and compressive strength CS)) increase nearly linearly with the increasing A/B and A/t in a certain range. However, it was also found that if A/t is too small, the ultrathin glass article has a comparatively low strength even if A/B is very high. The value of 0 for A/B in the following means there is no noticeable chamfer. Of course the same applies to the ratios A'/B' and A'/t.

It was even surprisingly found that the chamfer shape, CS and bending strength relationship is relatively independent of glass type and edge treatment method, either the glass is aluminosilicate, lithium aluminosilicate, soda-lime, boron aluminosilicate, borosilicate type, or the edge is treated by mechanical grinding, brush polishing, chemical etching or the combinations of each other.

The cutting/separation of the glass or glass article can be done by every suitable method, for example by laser, cut and scribe by wheel, etching, grinding. The special designed chamfer shape can be produced by chemical etching, mechanical grinding, laser processing, wheel cutting or a combination of the above mentioned processing methods. In one embodiment, the chamfer shape can be formed during the intermediate steps and the following processing steps are used to reduce the flaw only. In another embodiment, the chamfer shape can be created during the latest processing step.

In one advantageous embodiment, the ultrathin glass is cut (e.g. cut and scribed by wheel), and preferably both surfaces are coated with surface protective layers, e.g. a polymer or resin, which prevent the breakage in the later mechanical edge grinding processing. This laminated ultrathin glass is CNC edge ground to get the desired chamfer geometry (width and height). It is optional that the edge/chamfer is chemically etched to remove the flaws generated during CNC edge grinding process. Alternatively the UTG could be coated with at least one protective layer first and then be cut into smaller pieces.

In another advantageous embodiment, the ultrathin glass is cut (e.g. cut and scribed by wheel), and several pieces of UTG are laminated together by polymer or resin, e.g. epoxy or PMMA glue. The edge of the stack is mechanical ground by CNC, which generates chamfer free ultrathin glasses stacked together. The stack is then immersed in an etching solution. The etching rate close to the glass-glue boundary surface is faster, and the chamfer with designed shape can be generated by carefully adjusting the etching solution concentration, time, temperature and the property of the glue.

In another alternative advantageous embodiment, several UTG pieces of a larger size are laminated together by polymer or resin, e.g. epoxy or PMMA glue. Then the large sized stack is separated by cutting (e.g. cutting wheel, laser) optionally CNC grinding, followed by the etching process mentioned in the last embodiment.

In another advantageous embodiment, the ultrathin glass is patterned with the desired final shape and printed or laminated with etchant resistance glue or film. The patterned ultrathin glass is immersed into etching solution and the glass is etched through. By adjusting the etching solution concentration, time, temperature, the chamfer shape can be controlled to reach the designed shape.

If etching is applied preference is given to an etching solution. In this embodiment, etching is thus carried out wet-chemically. This is advantageous in order to remove glass constituents from the surface during etching. As etching solution, it is possible to use both acidic and alkaline solutions. As acidic etching media, HF, HCl, $H_2SO_4$, ammonium bifluoride, $HNO_3$ solutions or mixtures of these acids are particularly suitable. For alkaline etching media, KOH or NaOH solutions are preferred. Greater rates of removal of material can typically be achieved using acidic etching solutions. However, basic solutions can be applied, if only a slow removal of material is sought.

To reach good chemical toughening performance, the glass should content fair amount of alkaline metal ions, preferably $Na_2O$, furthermore, adding less amount $K_2O$ to glass composition can also improve chemical toughening rate. Furthermore, it is found that adding $Al_2O_3$ to glass composition can significantly improve the toughening performance of glass.

$SiO_2$ is the major glass network former in the glasses of the present invention. Additionally, also $Al_2O_3$, $B_2O_3$ and $P_2O_5$ may be used as glass network formers. The content of the sum of $SiO_2$, $B_2O_3$ and $P_2O_5$ should not be less than 40% for common production method. Otherwise, the glass sheet may be difficult to form and could become brittle and loose transparency. A high $SiO_2$ content will require high melting and working temperature of glass production, usually it should be less than 90%. In preferred embodiments, the content of $SiO_2$ in the glass is between 40 and 75 wt.-%, more preferred between 50 and 70 wt.-%, even more preferably between 55 and 68 wt.-%. In other preferred embodiments, the content of $SiO_2$ in the glass is between 55 and 69 wt.-%, more preferred between 57 and 66 wt.-%, even more preferably between 57 and 63 wt.-%. In a further preferred embodiment, the content of $SiO_2$ in the glass is between 60 and 85 wt.-%, more preferred between 63 and 84 wt.-%, even more preferably between 63 and 83 wt.-%. In another further preferred embodiment, the content of $SiO_2$ in the glass is between 40 and 81 wt.-%, more preferred between 50 and 81 wt.-%, even more preferably between 55 and 76 wt.-%. Adding the $B_2O_3$ and $P_2O_5$ to $SiO_2$ could modify the network property and reduce the melting and working temperature of glass. Also, the glass network former has big influence on the CTE of glass.

In addition, the $B_2O_3$ in the glass network forms two different polyhedron structures which are more adaptable to loading force from outside. Addition of $B_2O_3$ can usually result in lower thermal expansion and lower Young's modulus which in turn leads to good thermal shock resistance and slower chemical toughening speed through which low CS and low DoL could be easily obtained. Therefore, the addition of $B_2O_3$ to ultrathin glass could greatly improve the chemical toughening processing window and ultrathin glass and widen the practical application of chemically toughened ultrathin glass. In preferred embodiments, the amount of $B_2O_3$ in the glass of the invention is between 0 and 20 wt.-%, more preferably between 0 and 18 wt.-%, more preferably between 0 and 15 wt.-%. In some embodiments the amount of $B_2O_3$ can be between 0 and 5 wt.-%, preferably between 0 and 2 wt.-%. In another embodiment the amount of $B_2O_3$ can be between 5 and 20 wt. %, preferably between 5 and 18 wt.-%. If the amount of $B_2O_3$ is too high, the melting point of the glass may be too high. Moreover, the chemical toughening performance is reduced when the amount of $B_2O_3$ is too high. $B_2O_3$ free variants can be preferred.

$Al_2O_3$ works both as glass network former and glass network modifier. The $[AlO_4]$ tetrahedral and $[AlO_6]$ hexahedral will be formed in the glass network depending on the amount of $Al_2O_3$, and they could adjust the ion-exchanging speed by changing the size of space for ion-exchange inside glass network. Generally, the content of this component varies depending on the respective glass type. Therefore, some glasses of the invention preferably comprise $Al_2O_3$ in an amount of at least 2 wt.-%, more preferably in an amount of at least 10 wt.-% or even at least 15 wt.-%. However, if the content of $Al_2O_3$ is too high, the melting temperature and working temperature of glass will also be very high and the crystalline will easily formed to make glass loose the transparency and flexibility. Therefore, some glasses of the invention preferably comprise $Al_2O_3$ in an amount of at most 30 wt.-%, more preferably at most 27 wt.-%, more preferably at most 25 wt.-%. Some advantageous embodiments can comprise $Al_2O_3$ in an amount of at most 20 wt.-%, preferably of at most 15 wt.-% or of at most 10 wt.-%, or even preferably at most 8 wt. %, preferably at most 7 wt. %, preferably at most 6 wt. %, preferably at most 5 wt. %. Some glass variants can be free of $Al_2O_3$. Other advantageous glass variants can comprise at least 15 wt. %, preferably at least 18 wt. % $Al_2O_3$ and/or at most 25 wt. %, preferably at most 23 wt. %, more preferably at most 22 wt. % $Al_2O_3$.

Alkaline oxides like $K_2O$, $Na_2O$ and $Li_2O$ work as the glass work modifier. They can break glass network and form non-bridge oxide inside glass network. Adding alkaline could reduce the working temperature of glass and increase CTE of glass. Sodium and lithium content is important for ultrathin flexible glass which is chemical toughenable, for $Na^+/Li^+$, $Na^+/K^+$, $Li^+/K^+$ ion exchange is a necessary step for the toughening, the glass will not be toughened if it does not contain alkaline itself. However, sodium is preferred over lithium because lithium may significantly reduce the diffusivity of the glass. Therefore, some glasses of the invention preferably comprise $Li_2O$ in an amount of at most 7 wt. %, preferably at most 5 wt. %, more preferably at most 4 wt. %, more preferably at most 2 wt. %, more preferably at most 1 wt. %, more preferably at most 0.1 wt. %. Some preferred embodiments are even free of $Li_2O$. Depending on the glass type a lower limit for $Li_2O$ can be 3 wt. %, preferably 3.5 wt. %.

The glasses of the invention preferably comprise $Na_2O$ in an amount of at least 4 wt. %, more preferably at least 5 wt. %, more preferably at least 6 wt. %, more preferably at least 8 wt. %, more preferably at least 10 wt. %. Sodium is very important for the chemical toughening performance as the chemical toughening preferably comprises the ion exchange of sodium in the glass with potassium in the chemical toughening medium. However, the content of sodium should also not be too high because the glass network may be severely deteriorated and glass may be extremely hard to be formed. Another important factor is that ultrathin glass should have low CTE, to meet such requirement glass should not contain too much $Na_2O$. Therefore, the glasses preferably comprises $Na_2O$ in an amount of at most 30 wt. %, more preferred at most 28 wt. %, more preferred at most 27 wt. %, more preferred at most 25 wt. %, more preferred at most 20 wt. %.

The glasses of the invention may comprise $K_2O$. However, as the glasses are preferably chemically toughened by exchanging sodium ions in the glass with potassium ions in the chemical toughening medium, a too high amount of $K_2O$ in the glass will compromise the chemical toughening performance. Therefore, the glasses of the invention preferably comprise $K_2O$ in an amount of at most 10 wt. %, more preferred at most 8 wt. %. Some preferred embodiments comprises at most 7 wt. %, other preferred embodiments at most 4 wt. %, more preferred at most 2 wt. %, more preferred at most 1 wt. %, more preferred at most 0.1 wt. %. Some preferred embodiments are even free of $K_2O$.

But the total amount of alkaline content should preferably not be higher than 35 wt.-%, preferably not higher than 30 wt. %, more preferably not higher than 28 wt. %, more preferably not higher than 27 wt. %, even preferably not higher than 25 wt. %, for the glass network may be severely deteriorated and glass may be extremely hard to be formed. Some variants comprise an alkaline content of at most 16 wt.-%, preferably of at most 14 wt.-%. Another important factor is that ultrathin glass should have low CTE, to meet such requirement glass should not contain too much alkali elements. However, as described above, the glasses should contain alkali elements in order to facilitate chemical toughening. Therefore, the glasses of the present invention preferably comprise alkali metal oxides in an amount of at least 2 wt. %, more preferred at least 3 wt. %, more preferred at least 4 wt. %, more preferred at least 5 wt. %, more preferred at least 6 wt. %.

Alkaline earth oxides such as MgO, CaO, SrO, BaO work as the network modifier and decrease forming temperature of glass. These oxides can be added to adjust the CTE and Young's modulus of glass. Alkaline earth oxides have very important function that they can change refractive index of glass to meet special requirements. For example, MgO could decrease the refractive index of glass and BaO could increase the refractive index. The weight content of alkaline earth oxides should preferably not be higher than 40 wt. %, preferably not higher than 30 wt.-%, preferably not higher than 25 wt.-%, also preferably not higher than 20 wt.-%, more preferably not higher than 15 wt.-%, more preferably not higher than 13 wt.-%, more preferably not higher than 12 wt.-%. Some variants of glasses can comprise alkaline earth oxides of at most 10 wt.-%, preferably of at most 5 wt.-%, more preferably of at most 4 wt.-%. If the amount of alkaline earth oxides is too high, chemical toughening performance may be deteriorated. A lower limit for alkaline earth oxides can be 1 wt. %, or 5 wt. %. Moreover, the crystallization tendency may be increased if the amount of alkaline earth oxides is too high. Some advantageous variants can be free of alkaline earth oxides.

Some transition metal oxides in glass, such as ZnO and $ZrO_2$, have similar function as alkaline earth oxides and may be comprised in some embodiments. Other transition metal oxides, such as $Nd_2O_3$, $Fe_2O_3$, CoO, NiO, $V_2O_5$, $MnO_2$, $TiO_2$, CuO, $CeO_2$, and $Cr_2O_3$, work as coloring agent to make glass with specific optical or photonic functions, for example, color filter or light convertor. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The advantageous compositions below refer to different glass types before toughening.

In one embodiment, the ultrathin flexible glass is alkali metal aluminosilicate glass comprising the following components in the indicated amounts (in wt. %):

| Component | (wt. %) |
| --- | --- |
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The alkali metal aluminosilicate glass of the invention has preferably comprises the following components in the indicated amounts (in wt. %):

| Component | (wt. %) |
| --- | --- |
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the alkali metal aluminosilicate glass of the invention comprises the following components in the indicated amounts (in wt. %):

| Components | (wt. %) |
| --- | --- |
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is soda lime glass comprising the following components in the indicated amounts (in wt. %):

| Component | (wt. %) |
| --- | --- |
| $SiO_2$ | 40-81 |
| $Al_2O_3$ | 0-10 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
| --- | --- |
| $SiO_2$ | 50-81 |
| $Al_2O_3$ | 0-8 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The soda lime glass of this invention preferably comprises the following components in the indicated amounts (in wt. %):

| Component | (wt. %) |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the soda lime glass of the invention comprises the following components in the indicated amounts (in wt. %):

| Component | (wt. %) |
|---|---|
| $SiO_2$ | 55-76 |
| $Al_2O_3$ | 0-6 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the soda lime glass of the invention comprises the following components in the indicated amounts (in wt. %):

| Component | (wt. %) |
|---|---|
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is lithium aluminosilicate glass comprising the following components in the indicated amounts (in wt. %):

| Component | (wt.- %) |
|---|---|
| $SiO_2$ | 55-69 |
| $Al_2O_3$ | 15-25 |
| $Li_2O$ | 3-7 |
| $Na_2O + K_2O$ | 0-30 |
| $MgO + CaO + SrO + BaO$ | 0-5 |
| ZnO | 0-4 |
| $TiO_2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents in an amount of from 0 to 2 wt. %. Rare earth oxides could also be added to add magnetic or photonic or optical functions to the glass sheet in an amount of 0 to 5 wt. %.

The lithium aluminosilicate glass of the invention preferably comprises the following components in the indicated amounts (in wt. %):

| Component | (wt.- %) |
|---|---|
| $SiO_2$ | 57-66 |
| $Al_2O_3$ | 15-23 |
| $Li_2O$ | 3-5 |
| $Na_2O + K_2O$ | 3-25 |
| $MgO + CaO + SrO + BaO$ | 1-4 |
| ZnO | 0-4 |
| $TiO_2$ | 0-4 |
| $ZrO_2$ | 0-5 |
| $TiO_2 + ZrO_2 + SnO_2$ | 2-6 |
| $P_2O_5$ | 0-7 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Most preferably, the lithium aluminosilicate glass of the invention comprises the following components in the indicated amounts (in wt. %):

| Component | (wt.- %) |
|---|---|
| $SiO_2$ | 57-63 |
| $Al_2O_3$ | 15-22 |
| $Li_2O$ | 3.5-5 |
| $Na_2O + K_2O$ | 5-20 |
| $MgO + CaO + SrO + BaO$ | 0-5 |
| ZnO | 0-3 |
| $TiO_2$ | 0-3 |
| $ZrO_2$ | 0-5 |
| $TiO_2 + ZrO_2 + SnO_2$ | 2-5 |
| $P_2O_5$ | 0-5 |
| F | 0-1 |
| $B_2O_3$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

In one embodiment, the ultrathin flexible glass is borosilicate glass comprising the following components in the indicated amounts (in wt. %):

| Composition | (wt.- %) |
|---|---|
| $SiO_2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The borosilicate glass of the invention preferably comprises the following components in the indicated amounts (in wt. %):

| Compositon | (wt.- %) |
|---|---|
| $SiO_2$ | 63-84 |
| $Al_2O_3$ | 0-8 |
| $B_2O_3$ | 5-18 |
| $Li_2O + Na_2O + K_2O$ | 3-14 |
| $MgO + CaO + SrO + BaO + ZnO$ | 0-12 |
| $TiO_2 + ZrO_2$ | 0-4 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

The borosilicate glass of the invention preferably comprises the following components in the indicated amounts (in wt. %):

| Compositon | (wt.- %) |
|---|---|
| $SiO_2$ | 63-83 |
| $Al_2O_3$ | 0-7 |
| $B_2O_3$ | 5-18 |
| $Li_2O + Na_2O + K_2O$ | 4-14 |
| $MgO + CaO + SrO + BaO + ZnO$ | 0-10 |
| $TiO_2 + ZrO_2$ | 0-3 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, $Cr_2O_3$. 0-2 wt. % of $As_2O_3$, $Sb_2O_3$, $SnO_2$, $SO_3$, Cl and/or F could be also added as refining agents. 0-5 wt. % of rare earth oxides could also be added to add magnetic or photonic or optical functions to the glass sheet.

Typically, the ultrathin glass according to the invention could be produced by polishing down or etching from thicker glass. These two methods are not economical and lead to bad surface quality which is quantified by Ra roughness for example.

Direct hot-forming production like down draw, overflow fusion method are preferred for the mass production. Redraw method is also advantageous. These mentioned methods are economical and the glass surface quality is high.

The strengthening, as called as toughening, can be done by immersing glass into melt salt bath with potassium ions or cover the glass by potassium ions or other alkaline metal ions contained paste and heated at high temperature at certain time. The alkaline metal ions with larger ion radius in the salt bath or the paste exchange with alkaline metal ions with smaller radius in the glass article, and surface compressive stress is formed due to ion exchange.

A chemically toughened glass article of the invention is obtained by chemically toughening a chemically toughenable glass article. The toughening process could be done by immersing the ultrathin glass article into a salt bath which contains monovalent ions to exchange with alkali ions inside glass. The monovalent ions in the salt bath has radius larger than alkali ions inside glass. A compressive stress to the glass is built up after ion-exchange due to larger ions squeezing in the glass network. After the ion-exchange, the strength and flexibility of ultrathin glass are surprisingly and significantly improved. In addition, the CS induced by chemical toughening improves the bending properties of the toughened glass article and could increase scratch resistance and impact resistance of glass so that toughened glass would not get scratched easily, and the DoL could increase the scratch tolerance that glass is less likely broken even scratched.

The most used salt for chemical toughening is Na+-contained or K+-contained melted salt or mixture of them. The commonly used salts are $NaNO_3$, $KNO_3$, NaCl, KCl, $K_2SO_4$, $Na_2SO_4$, $Na_2CO_3$, and $K_2CO_3$. Additives like NaOH, KOH and other sodium salt or potassium salt could be also used for better controlling the speed of ion-exchange, CS and DoL during chemical toughening. Ag+-containing or $Cu^{2+}$-containing salt bath could be used to add anti-microbial function to ultrathin glass.

The chemical toughening is not limit to single step. It can include multi steps in salt bath with alkaline metal ions of various concentrations to reach better toughening performance. Thus, the chemically toughened glass article according to the invention can be toughened in one step or in the course of several steps, e.g. two steps.

The chemically toughened glass article according to the invention can have just one surface (first surface) where a compressive stress region extending from the first surface to a first depth in the glass article (DoL) exists, wherein the region is defined by a compressive stress (CS). In this case the glass article comprises only one toughened side. Preferably the glass article according to the invention also comprises a second surface—opposite to the first surface—where a second compressive stress region extending from the second surface to a second depth in the glass article (DoL) exists, the region is defined by a compressive stress (CS). This preferred glass article is toughened on both sides.

CS mostly depends on the composition of glass. Higher content $Al_2O_3$ can be helpful to achieve higher CS. After toughening, the ultrathin glass should have high enough CS to achieve high strength. Therefore, CS is equal to or more than 100 MPa, preferably more than 100 MPa, preferably more than 200 MPa, more preferably more than 300 MPa, also preferably more than 400 MPa, further preferably more than 500 MPa. In especially preferred embodiments, CS is more than 600 MPa, further preferably more than 700 MPa, more preferably more than 800 MPa.

Generally, DoL depends on glass composition, but it can increase nearly infinitely with increased toughening time and toughening temperature. A defined DoL is essential to ensure the stable strength of toughened glass, but too high DoL increases the self-breakage ratio and the strength performance when the ultrathin glass article is under compressive stress, so DoL should be preferably controlled.

In some embodiments, high sharp contact resistance of bare glass is required, and low DoL is preferred. To achieve the defined low DoL the toughening temperature and/or the toughening time is/are reduced. According to the invention, a lower toughening temperature may be preferred as DoL is more sensitive to the temperature and a longer toughening time is easily to be set during mass production. However, a reduced toughening time is also possible in order to decrease DoL of the glass article.

The advantageous value of DoL depends in each case on the glass composition, the thickness and applied CS of the respective glass article. In general, glass articles according to the above-mentioned advantageous embodiment have a quite low DoL. By decreasing the DoL, the CT decreases. If high impact and/or press press force is applied on such embodiments by sharp objects, the caused defects will just be on the glass surface. Since the CT is reduced significantly the caused defect is not able to overcome the internal strength of the glass article, and thus the glass article does not break into two or several pieces. Such a glass article with low DoL has an improved sharp contact resistance.

According to some advantageous embodiments of the invention the toughened glass article may have a CT of less than or equal to 1000 MPa, more preferably less than or equal to 700 MPa. Preferred are glass articles having a CT of less than or equal to 300 MPa, more preferably less than or equal to 200 MPa, more preferably less than or equal to 100 MPa. Some advantageous embodiments can have a CT of less than or equal to 65 MPa. Other advantageous embodiments can have a CT of less than or equal to 45 MPa. Some variants may even have a CT of less than or equal to 25 MPa.

As mentioned above CS, DoL and CT depends on the glass composition (glass type), glass thickness and toughening conditions.

In order to improve impact resistance the chemically toughened glass article preferably comprises at least at one surface a coated or laminated layer of an organic or inorganic material.

According to an advantageous embodiment, the toughened glass article comprises at least one laminated polymer layer wherein the polymer layer has a thickness of at least 1 µm, preferably of at least 5 µm, further preferably of at least 10 µm, more preferably of at least 20 µm, most preferably of at least 40 µm to reach the improved sharp contact force. An upper limit for the thickness of polymer layer could be 200 µm. Lamination can be performed by different known methods.

In the case of lamimation, the polymer material can be selected for example from the group consisting of a silicone polymer, a sol-gel polymer, polycarbonate (PC), polyethersulphone, polyacrylate, polyimide (PI), an inorganic silica/polymer hybrid, a cycloolefin copolymer, a polyolefin, a silicone resin, polyethylene (PE), polypropylene, polypropylenepolyvinyl chloride, polystyrene, styrene-acrylonitrile copolymer, polymethyl methacrylate (PMMA), ethylene-vinyl acetate copolymer, polyethylene terephthalate (PET), polybutylene terephthalate, polyamide (PA), polyacetal, polyphenyleneoxide, polyphenylenesulfide, fluorinated polymer, a chlorinated polymer, ethylene-tetrafluoroethylene (ETFE), polytetrafluoroethylene (PTFE), polyvinyl chloride (PVC), polyvinyli-dene chloride (PVDC), polyvinylidene fluoride (PVDF), polyethylene naphthalate (PEN), a terpolymer made of tetrafluroethylene, a terpolymer made of hexafluoropropylene, and a terpolymer made of vinylidene fluoride (THV) or polyurethane, or mixtures thereof. The polymer layer can be applied onto the ultrathin chemically toughened glass article by any known method.

A coating of a protective layer by different methods such as chemical vapor deposition method (CVD), dip-coating, spin-coating, ink-jet, casting, screen printing, painting and spaying may be advantageous, especially as final layer after processing. However, the invention is not limited to those procedures. Suitable materials are also known in the art. For example they can comprise a duroplastic reaction resin that is a polymer selected from the group consisting of phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, silicone resins, crosslinking polyurethane resins, polymethacrylate reaction resins, and polyacrylate reaction resins.

The glass articles can be additionally coated for e.g. anti-reflection, anti-scratch, anti-fingerprint, anti-microbial, anti-glare and combinations of these functions.

The glass articles can be used in the field of cover and substrate for flexible and foldable electronics, like image sensor, display cover, screen protector. In addition it can be used for example in the following application fields of display substrate or protection cover, finger print sensors cover, general sensor substrate or cover, cover glass of consumer electronics, protective covers of displays and other surfaces, especially bended surfaces. Moreover, the glass articles may also be used in the applications of display substrate and cover, fingerprint sensor module substrate or cover, semiconductor package, thin film battery substrate and cover, foldable display. In specific embodiments, the glass articles may be used as cover film for resistance screens, and expendable protective films for display screens, cell phones, cameras, gaming gadget, tablet, laptops, TV, mirror, windows, aviation widows, furniture, and white goods.

The invention is especially suitable for being used in the applications of display substrate and cover, fragile sensors, fingerprint sensor module substrate or cover, semiconductor package, thin film battery substrate and cover, foldable display. Further it can be used in flexible electronic devices providing thin, lightweight and flexible properties (e.g. curved displays, wearable devices). Such flexible devices also requires flexible substrates e.g. for holding or mounting components. In addition flexible displays with high contact resistance and small bending radii are possible.

According to the invention is also a method of producing a glass article according to the invention, the method comprising the following steps:
  a) Providing a composition of raw materials for the desired glass,
  b) Melting the composition,
  c) Producing a glass article in a flat glass process,
  d) Producing a cut to size glass article with a special chamfer shape
  e) Chemically toughening the glass article, and
  f) Optionally coating at least one surface of the article with a coating layer.
  g) Optionally laminating at least one surface of the article with a polymer layer, wherein the toughening temperature and/or toughening time is reduced.

Of course, the steps d to g can be performed in a different order if it is advantageous or desired.

Preferably the flat glass process is a down draw process or a redraw process.

Advantageously the chemically toughening process comprises an ion-exchange process. For mass production it will be favorable if the ion-exchange process comprises immerging the glass article of a part of the glass article into a salt bath containing monovalent cations. Preferably the monovalent cations are potassium ions and/or soda ions.

The special chamfer shape can be produced by chemical etching, mechanical grinding, laser processing, wheel cutting or the combinations of the above-mentioned processing together.

Further it is advantageous if the glass article or a part of the glass article is immersed in the salt bath at a temperature between 340° C. and 480° C. for 30 seconds to 48 hours.

For some glass types it may be preferred if the chemical toughening comprises two consecutive toughening steps, wherein the first step comprises toughening with a first toughening agent and the second step comprises toughening with a second toughening agent. Preferably the first toughening agent and the second toughening agent comprise or consist of $KNO_3$ and/or $NaNO_3$ and/or mixtures thereof.

Further details of the manufacturing and the toughening procedure have already been described above.

TABLE 1

Glass compositions

| Composition (wt %) | Glass Type 1 | Glass Type 2 | Glass Type 3 | Glass Type 4 | Glass Type 5 | Glass Type 6 | Glass Type 7 | Glass Type 8 |
|---|---|---|---|---|---|---|---|---|
| $SiO_2$ | 61 | 53 | 62 | 61.5 | 61 | 65 | 70 | 80 |
| $Al_2O_3$ | 17 | 23 | 17.5 | 17.5 | 18 | 4 | — | 3 |
| $Li_2O$ | — | — | — | — | 5 | — | — | — |
| $Na_2O$ | 12 | 11 | 15 | 14.2 | 10 | 6 | 9.5 | 5 |
| $K_2O$ | 4 | 5 | 2 | 2 | — | 7 | 8 | — |
| MgO | 4 | 2 | 2.5 | 2.5 | — | — | — | — |
| CaO | — | — | — | — | 1 | — | 6 | — |
| BaO | — | — | — | — | — | — | 2.5 | — |
| ZnO | — | — | — | 1 | — | 6 | 4 | — |
| $ZrO_2$ | 2 | — | 1 | 1.3 | 4 | — | — | — |
| $B_2O_3$ | — | 6 | — | — | 1 | 8 | — | 12 |
| $TiO_2$ | — | — | — | — | 4 | — | — | — |

TABLE 2

Comparison Examples (C.Ex.)

| | C.Ex. 1 | C.Ex. 2 | C.Ex. 3 | C.Ex. 4 | C.Ex. 5 | C.Ex. 6 | C.Ex. 7 | C.Ex. 8 | C.Ex. 9 |
|---|---|---|---|---|---|---|---|---|---|
| Glass Type | 6 | 1 | 1 | 3 | 2 | 5 | 4 | 7 | 8 |
| Length (mm) | 100 | 100 | 100 | 100 | 200 | 150 | 160 | 150 | 150 |
| Width (mm) | 100 | 50 | 50 | 80 | 80 | 120 | 120 | 110 | 120 |
| t (μm) | 50 | 70 | 70 | 100 | 210 | 90 | 30 | 45 | 200 |
| Tough. Temp. (° C.) | 400 | 390 | 390 | 390 | 390 | 400 | 390 | 390 | 400 |
| Tough. time (min) | 60 | 25 | 25 | 30 | 30 | 180 | 15 | 30 | 180 |
| Chamfer processing | wheel cut | wheel cut + CNC grind. | CNC grind. with surf. prot. | laser cut + etch. | CNC grind. + etch. | CNC grind. with surf. prot. | laser cut | wheel cut + grind. | CNC grind. + etch. |
| B (μm) | / | / | 15 | / | 50 | 25 | / | / | 40 |
| A (μm) | / | / | 15 | / | 50 | 25 | / | / | 40 |
| A/t | 0.0 | 0.0 | 0.0 | 0.0 | 0.2 | 0.3 | 0.0 | 0.0 | 0.2 |
| A/B | 0.0 | 0.0 | 0.0 | 0.0 | 1.0 | 1.0 | 0.0 | 0.0 | 1.0 |
| CS (MPa) | 342 | 730 | 730 | 785 | 801 | 767 | 685 | 408 | 127 |
| DoL (μm) | 7 | 10 | 10 | 9 | 9 | 7 | 6 | 5 | 6 |
| CT (MPa) | 67 | 146 | 146 | 86 | 38 | 71 | 228 | 58 | 4 |
| BS (MPa) | 427 | 786 | 845 | 823 | 887 | 843 | 764 | 545 | 198 |
| BBR (mm) | 4.3 | 3.3 | 3.1 | 4.5 | 8.8 | 4.0 | 1.5 | 3.1 | 37.4 |
| BS-CS (MPa) | 85 | 56 | 115 | 38 | 86 | 76 | 79 | 137 | 71 |

TABLE 3

Working Examples (Ex.)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| Glass Type | 1 | 2 | 3 | 4 | 5 | 7 | 3 | 2 | 8 | 1 | 1 | 1 | 1 |
| Length (mm) | 100 | 180 | 150 | 180 | 165 | 170 | 130 | 120 | 180 | 150 | 200 | 100 | 140 |
| Width (mm) | 100 | 130 | 70 | 140 | 120 | 125 | 80 | 120 | 30 | 120 | 35 | 100 | 70 |
| t (μm) | 100 | 30 | 85 | 50 | 75 | 70 | 70 | 50 | 40 | 70 | 210 | 70 | 70 |
| Tough. Temp. (°C.) | 390 | 390 | 390 | 390 | 420 | 390 | 390 | 390 | 440 | 390 | 390 | 390 | 390 |
| Tough. time (min) | 25 | 15 | 5 | 30 | 120 | 120 | 60 | 20 | 360 | 15 | 45 | 30 | 20 |
| Chamfer processing | CNC grinding with surface protection | Cut to size + lamina. + etch. | etch cut | Laminat. + cut to size + etch | CNC grinding with surface protect. | CNC grinding with surface protect. | Laminat. + cut to size + etch. | Cut to size + laminat. + etch. | Laminat. + cut to size + etch. | etch cut | Laminat. + cut to size + etch. | Cut to size + laminat. + etch. | Cut to size + laminat. + etch. |
| B (μm) | 25 | 10 | 36 | 12 | 37 | 18 | 18 | 16 | 13 | 30 | 42 | 13 | 20 |
| A (μm) | 53 | 60 | 128 | 49 | 58 | 33 | 83 | 70 | 53 | 113 | 170 | 130 | 140 |
| A/t | 0.5 | 2.0 | 1.5 | 1.0 | 0.8 | 0.5 | 1.2 | 1.4 | 1.3 | 1.6 | 0.8 | 1.9 | 2.0 |
| A/B | 2.1 | 6.0 | 3.6 | 4.1 | 1.6 | 1.8 | 4.6 | 4.4 | 4.1 | 3.8 | 4.0 | 10.0 | 7.0 |
| CS (MPa) | 727 | 782 | 849 | 865 | 680 | 405 | 846 | 795 | 120 | 746 | 769 | 723 | 723 |
| DoL (μm) | 10 | 6 | 4 | 10 | 9 | 9 | 14 | 8 | 9 | 8 | 15 | 10 | 10 |
| CT (MPa) | 91 | 261 | 44 | 288 | 107 | 70 | 282 | 187 | 49 | 111 | 64 | 145 | 145 |
| BS (MPa) | 1280 | 1649 | 1504 | 1261 | 1006 | 875 | 1585 | 1255 | 756 | 1578 | 1126 | 1063 | 1304 |
| BBR (mm) | 2.9 | 0.7 | 2.1 | 1.5 | 2.8 | 3.0 | 1.6 | 1.5 | 2.0 | 1.6 | 6.9 | 2.4 | 2.0 |
| BS - CS (MPa) | 553 | 867 | 655 | 396 | 326 | 470 | 739 | 460 | 636 | 832 | 357 | 340 | 581 |

Table 1 shows the compositions of several typical embodiments of direct hot-forming ultrathin glasses which are chemically toughenable.

Glass articles of the different glass types were produced in a down draw process and chemically toughened to form ultrathin chemically toughened glass articles. Each ultrathin glass article has a first surface and a second surface. In the embodiments shown each sample representing a glass article is toughened on both sides. So there is a compressive stress region with a certain depth (DoL) on each side of the glass article. Here, the chamfered edge was generated first, followed by chemically toughening. For determining the properties of comparison examples (Table 2) and working examples (Table 3) at least 15 samples of each kind were prepared and tested.

Comparison examples 1, 2, 4, 7, 8 are glasses of various thicknesses and glass types which have nearly no chamfer. The chamfer free edge can be made by laser cut, wheel cut and scribing and edge grinding following by etching in some cases. The bending strength BS of these comparison examples are only slightly higher than the value of CS and they are located at the left right corner of FIGS. 7 and 8.

Comparison examples 3, 5, 6 and 9 have the chamfer size mimic similar to thick glass edge processing, i.e. the ratio of chamfer width versus chamfer height is closed to 1 (similar to 45° chamfer), and the bending strength is not significantly higher than CS, either. To avoid thin glass breakage and reduce chipping size, a 100 μm epoxy protection film has been deposited on both side of glass before CNC edge grinding (comparison examples 3, 6), and the epoxy protection layer is cleaned out by acetone before further cleaning and toughening process. Other materials which are suitable as protection films have been mentioned above. Slight chemical etching can be applied after the CNC grinding process to repair the defects created in the mechanical grinding process.

In the following the working examples are only called "examples". Example 1 is an aluminosilicate glass and processed by the same edge processing as comparison example 3, while different grinding wheels are used, so it has a higher chamfer width/chamfer height ratio, so the bending strength is significantly higher than comparison examples (especially comparison example 3).

Example 2 is another aluminosiliate glass and uses a different technique to obtain the desired chamfer shape. The cut to size thin glasses are laminated together by a UV curable PMMA or epoxy-based glue. After laminating 10 pieces of thin glasses together to get enough stiffness, the laminates are cured to improve the stiffness further. The laminates are then processed by CNC grinding to get a vertical edge without chamfer. The laminates are then chemical etched in diluted HF solution for certain time until the desired chamfer size is obtained. The laminates are then baked to reduce the glue lamination force and single piece ultrathin glass is peeled off from the laminates. The normal cleaning and toughening processing are applied later. An even higher ratio of chamfer width/height is obtained and a bending strength value is obtained which is much higher than the CS value of the sample.

Example 3 is further another aluminosilicate glass type and uses a further different technique to obtain the preferred chamfer shape. Here, a big piece of ultrathin glass is double side patterned with acid-resistant ink, and the ink covers the area which corresponds to the desired final sample size. The patterned ultrathin glass is immersed into a chemical to etch through the thickness where there is no ink deposition. The obtained samples also have a high ratio of chamfer width/height and a high bending strength.

Example 4 is a further different aluminosilicate glass type and uses a modified technique from example 2 to obtain the preferred chamfer shape. The glasses are laminated in much bigger size than the final product. After curing, the laminates are cut by wheel to get the close to final product shape and then CNC edge grinding is performed. The chamfer size is still defined by controlled etching solution and time.

Examples 5 and 6 are lithium aluminosilicate glass type and soda-lime glass type and use the same chamfer processing as example 1. Example 6 needs longer toughening time to achieve the similar DoL as examples 1-4.

Example 7 is the same glass type as example 3 but has the same chamfer processing as example 4. Both example 7 and example 3 have a high BS despite of the different chamfer processing.

Example 8 is the same glass type and has the same processing as example 2 but a higher thickness.

Example 9 is a high boron containing borosilicate glass, it has a lower DoL. However, after same chamfer processing as example 4 and toughening its bending strength also follows the finding claimed in this invention. It is a proof that the chamfer shape—bending strength relationship described in this invention is generally applicable regardless of glass type.

Example 10 uses a further different chamfer processing. The article has the finial thickness of 70 μm, while the starting thickness is 210 μm. The 210 μm glass is cut and then CNC ground to get a chamfer shape same as comparison example 4. The ground 210 μm glass sample is then immersed into an etching solution without surface or edge protection. After the thickness is reduced to 70 μm, the ratio between chamfer width/height also changes. The bending strength after toughening also increases significantly compared with comparison examples 3, 5 or 6.

Example 11 is the same glass type as example 1 and has the same processing as example 4, but a higher thickness.

Example 12 is a special example, and it is not included in the plot of FIG. 7 and FIG. 8. It has a very high ratio of chamfer width/height, while the bending strength does not increase to such an extend compared with the increasing chamfer width/height ratio. Therefore, the ratio of chamfer width/height should be controlled to be smaller than 20, preferably smaller than 15, preferably smaller than 10, or even preferably smaller than 8 to achieve the best bending strength.

Example 13 is the same glass type as example 12 and also has the same processing, but a smaller ratio of chamfer width/height. As can be seen, the bending strength of example 13 is higher compared to example 12.

What is claimed is:

1. A chemically toughened glass article, comprising:
   a thickness (t) of less than 0.2 mm;
   a first surface;
   a second surface;
   a compressive stress region defined by a compressive stress (CS) of at least 100 MPa;
   an edge connecting the first surface and the second surface; and
   a bending strength (BS) of greater than 700 MPa,
   wherein the edge has a chamfer with a chamfer width (A) and a chamfer height (B),
   wherein the chamfer has a first ratio of chamfer width to chamfer height (A/B) of between 1.5 to 20, and
   wherein the chamfer has a second ratio of chamfer width to glass thickness (A/t) of greater than 0.7.

2. The article of claim 1, wherein the thickness is less than or equal to 0.18 mm and is greater than or equal to 0.005 mm.

3. The article of claim 1, wherein the thickness is less than or equal to 0.15 mm.

4. The article of claim 1, wherein the first ratio is between 2 to 15.

5. The article of claim 1, wherein the chamber chamfer comprises a first chamfer towards the first surface and a second chamfer towards the second surface.

6. The article of claim 5, wherein the first chamfer and the second chamfer are symmetrical.

7. The article of claim 5, wherein the first ratio of the first chamfer differs from the first ratio of the second chamfer by less than 30%.

8. The article of claim 1, wherein the second ratio is greater than 1.2.

9. The article of claim 1, wherein the compressive stress (CS) greater than 2000 MPa.

10. The article of claim 1, wherein the compressive stress has a depth of layer (DoL) from greater than 1 μm to less than 40 μm.

11. The article of claim 1, wherein the bending strength (BS) is greater than 1200 MPa.

12. The article of claim 1, further comprising a difference of the bending strength to the compressive stress of at least 150 MPa.

13. The article of claim 12, wherein the difference is at least 500 MPa.

14. The article of claim 1, further comprising an average bending strength (BS) of higher than $$CS + 10a\frac{A}{B} - a\left(\frac{A}{B} - 1\right)^2 + 20a\frac{A}{t},$$

wherein "a" is a constant of greater than or equal to 4.

15. The article of claim 1, further comprising an average breakage bending radius that is smaller than $$\frac{50000t}{CS + 10a\frac{A}{B} - a\left(\frac{A}{B} - 1\right)^2 + 20a\frac{A}{t}},$$

wherein "a" is a constant of greater than or equal to 4.

16. The article of claim 1, further comprising a bending radius that is smaller than $$\frac{100000t}{CS + 10a\frac{A}{B} - a\left(\frac{A}{B} - 1\right)^2 + 20a\frac{A}{t}}$$

without breakage, wherein "a" is a constant that is greater than or equal to 4.

17. The article of claim 1, wherein the edge has a structured section with a plurality of rounded, hemispherical depressions.

18. The article of claim 1, further comprises a pen drop breakage resistance height of higher than 20 mm with or without additional materials depositing or laminating on the first or second surface.

19. The article of claim 1, further comprising a coating or laminated layer of an organic or inorganic material on the first and/or second surface.

20. The article of claim 1, wherein the article is configured for a use selected from a group consisting of: a cover for a flexible electronic, a cover for a foldable electronic, a substrate for a flexible electronic, a substrate for a foldable electronic, an image sensor, a display cover, a screen protector, a display substrate, a cover substrate, a fragile sensor, a fingerprint sensor module substrate, a fingerprint sensor module cover, a semiconductor package, a thin film battery substrate, a thin film battery cover, and a foldable display.

21. A chemically toughened glass article, comprising:
a thickness (t) of less than 0.2 mm;
a first surface;
a second surface;
a compressive stress region defined by a compressive stress (CS) of at least 100 MPa; and
an edge connecting the first surface and the second surface; and,
wherein the edge has a chamfer with a chamfer width (A) and a chamfer height (B),
wherein the chamfer has a first ratio of chamfer width to chamfer height (A/B) of between 1.5 to 20,
wherein the chamfer has a second ratio of chamfer width to glass thickness (A/t) of greater than 0.7,
wherein the chamfer comprises a first chamfer towards the first surface and a second chamfer towards the second surface, and
wherein the first ratio of the first chamfer differs from the first ratio of the second chamfer by less than 30%.

22. A chemically toughened glass article, comprising:
a thickness (t) of less than 0.2 mm;
a first surface;
a second surface;
a compressive stress region defined by a compressive stress (CS) of at least 100 MPa;
an edge connecting the first surface and the second surface; and
an average bending strength (BS) of higher than $$CS + 10a\frac{A}{B} - a\left(\frac{A}{B} - 1\right)^2 + 20a\frac{A}{t},$$

wherein "a" is a constant of greater than or equal to 4,
wherein the edge has a chamfer with a chamfer width (A) and a chamfer height (B),
wherein the chamfer has a first ratio of chamfer width to chamfer height (A/B) of between 1.5 to 20, and
wherein the chamfer has a second ratio of chamfer width to glass thickness (A/t) of greater than 0.7.

23. A chemically toughened glass article, comprising:
a thickness (t) of less than 0.2 mm;
a first surface;
a second surface;
a compressive stress region defined by a compressive stress (CS) of at least 100 MPa;
an edge connecting the first surface and the second surface; and
a bending radius that is smaller than $$\frac{100000t}{CS + 10a\frac{A}{B} - a\left(\frac{A}{B} - 1\right)^2 + 20a\frac{A}{t}}$$

without breakage, wherein "a" is a constant that is greater than or equal to 4, wherein the edge has a chamfer with a chamfer width (A) and a chamfer height (B),
wherein the chamfer has a first ratio of chamfer width to chamfer height (A/B) of between 1.5 to 20, and
wherein the chamfer has a second ratio of chamfer width to glass thickness (A/t) of greater than 0.7.

* * * * *